United States Patent
Statia et al.

(10) Patent No.: US 7,895,319 B2
(45) Date of Patent: Feb. 22, 2011

(54) VARIABLE DNS RESPONSES BASED ON CLIENT IDENTITY

(75) Inventors: Jeromy S. Statia, Duvall, WA (US); Christopher J. Engdahl, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 395 days.

(21) Appl. No.: 11/981,335

(22) Filed: Oct. 31, 2007

(65) Prior Publication Data

US 2009/0113074 A1 Apr. 30, 2009

(51) Int. Cl.
*G06F 15/16* (2006.01)
(52) U.S. Cl. .................. 709/224; 709/245
(58) Field of Classification Search ............. 709/245, 709/224
See application file for complete search history.

(56) References Cited

U.S. PATENT DOCUMENTS

| | | | |
|---|---|---|---|
| 7,562,384 B1 * | 7/2009 | Huang | 726/5 |
| 2002/0042883 A1 * | 4/2002 | Roux et al. | 713/201 |
| 2002/0152309 A1 * | 10/2002 | Gupta et al. | 709/225 |
| 2002/0161925 A1 | 10/2002 | Munger et al. | |
| 2003/0177236 A1 | 9/2003 | Goto et al. | |
| 2004/0250119 A1 | 12/2004 | Shelest et al. | |
| 2005/0078824 A1 * | 4/2005 | Malinen et al. | 380/247 |
| 2006/0140182 A1 * | 6/2006 | Sullivan et al. | 370/389 |
| 2009/0112814 A1 * | 4/2009 | Statia et al. | 707/3 |
| 2009/0113074 A1 * | 4/2009 | Statia et al. | 709/245 |

OTHER PUBLICATIONS

"International Search Report", Filed Date Oct. 24, 2008, Application No. PCT/US2008/081124, pp. 1-13.

* cited by examiner

*Primary Examiner*—Wing F Chan
*Assistant Examiner*—Tesfay Yohannes
(74) *Attorney, Agent, or Firm*—Russell S. Krajec; Krajec Patent Offices, LLC

(57) ABSTRACT

An address resolver such as a DNS service may use the identity of a requesting client device to determine a response of a network address for a hostname in a request. A requesting client device may transmit a hardware or user identifier to an address resolving server in order to authenticate the client. The server may determine if the requesting client is authorized to have access to the requested hostname, and respond with the network address when the client is authorized. The address resolver may be used to limit access for users to various devices or hosts across a network and in some cases may track which users are accessing which hosts.

17 Claims, 3 Drawing Sheets

VARIABLE DNS RESPONSES BASED ON CLIENT IDENTITY

BACKGROUND

Domain Name Service (DNS) is a technology used within various networks, including the Internet, to resolve a common name, such as example.com to an Internet Protocol (IP) address that is generally a complex series of numbers. Many applications, such as web browsers, may use the DNS service to resolve names when making various queries or establishing connections across a network. In many private networks, such as a company or home intranet, a DNS service may service DNS requests within the network and, when a query fails within the local network, a query may roll over to an Internet or wide area network DNS service.

SUMMARY

An address resolver such as a DNS service may use the identity of a requesting client device to determine a response of a network address for a hostname in a request. A requesting client device may transmit a hardware or user identifier to an address resolving server in order to authenticate the client. The server may determine if the requesting client is authorized to have access to the requested hostname, and respond with the network address when the client is authorized. The address resolver may be used to limit access for users to various devices or hosts across a network and in some cases may track which users are accessing which hosts.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
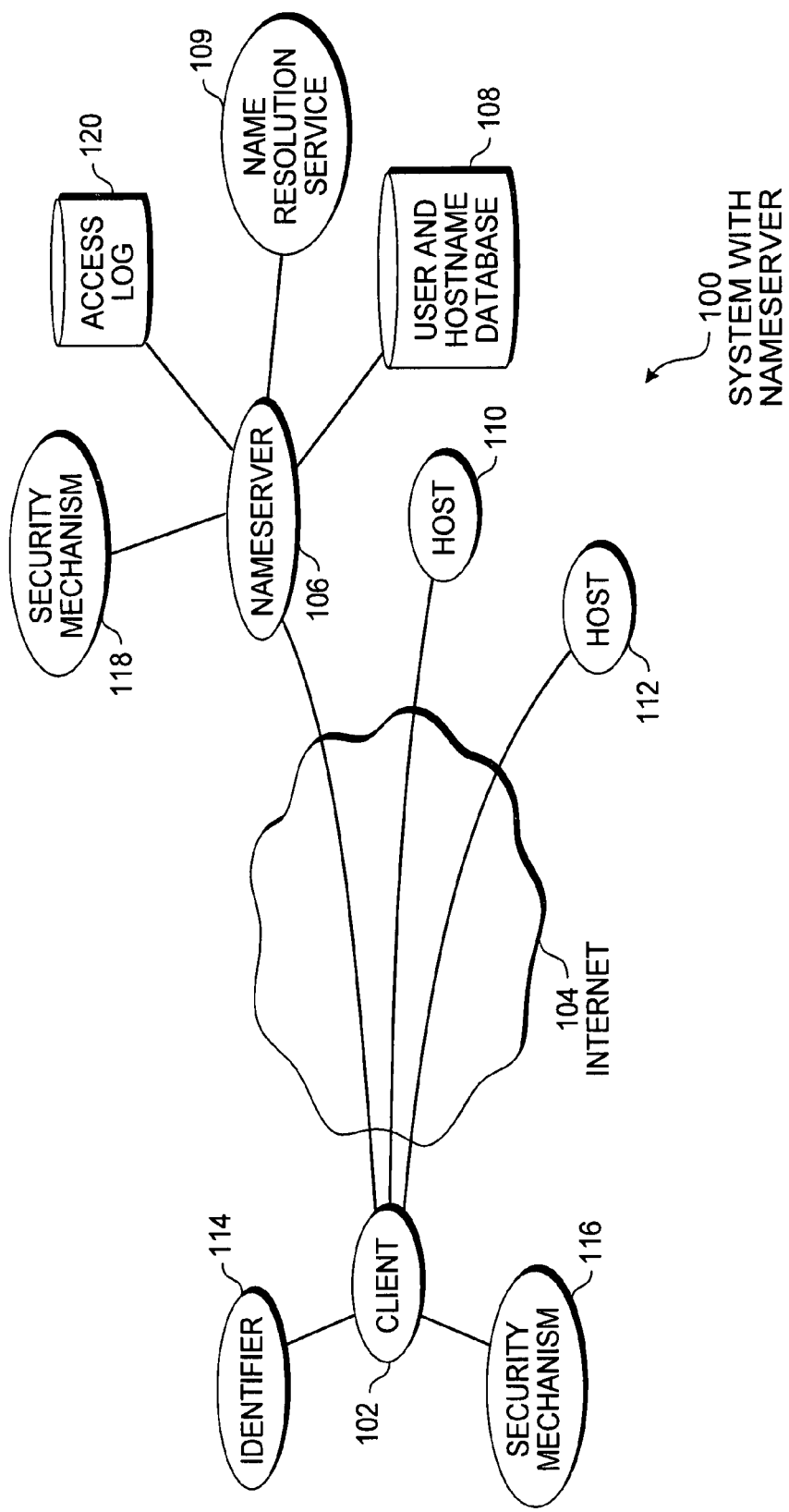
FIG. 1 is a diagram illustration of an embodiment showing a system with a nameserver.

A nameserver such as a DNS nameserver may respond to a client query using the client identity to determine how to respond to the query. The nameserver may have a database of authorized clients for specific hosts, and may make some hosts available to certain clients but not other clients.

The nameserver may use various forms of authentication to establish the client identity, including using identifiers that may identify the particular hardware or the particular user. In many embodiments, the nameserver may create a log of requests which may contain an authenticated user or client and the host accessed by the client, along with a date stamp.

The nameserver may be used to control access to various hosts based on the client or user identification. In one use scenario, one group of users may be given access to a host to which other users may not have access. For example, a user who is a member of the human resources department may be given an address to a server accessible only for department members while another user may be given an address to another server, even though both users queried for the same hostname.

In another use scenario, a nameserver may be accessible on the Internet and may give an address to an authenticated user for a specific server but may ignore other requests. Such a use may permit a hostname to be used by authorized users but may not make the hostname commonly known or available to the general public.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a network with a nameserver. Embodiment 100 is a simplified example used to highlight various characteristics, features, and uses of a nameserver with a client authentication system and a database with users and hostnames.

The diagram of FIG. 1 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

Embodiment 100 is a simplified example of various components, devices, and functions that may be used with an authenticating nameserver. A client 102 may use the Internet 104 or other network to access a nameserver 106. The nameserver 106 may resolve network addresses for hostnames. One embodiment of a nameserver 106 may be a Domain Name Service (DNS) server. For example, a nameserver may resolve the text based name www.example.com to an internet address 216.173.23.111.

In many embodiments, a nameserver 106 may be used to direct requests to a new server address when the address changes. In the example above, the host for www.example.com may be changed from one hardware device with address 216.173.23.111 to another device with a network address of 115.10.3.240. By updating the nameserver 106, the physical address of the server may be changed while keeping the text based name the same.

The nameserver 106 may have a name resolution service 109 that operates on the nameserver 106 and responds to hostname address queries from various clients. An example of a name resolution service 109 is described as embodiment 300 of FIG. 3.

When a client 102 makes a hostname address request of the nameserver 106, the nameserver 106 may request an identifier 114 from the client 102. The identifier 114 may be any type of identifier, including hardware type identifiers as well as user type identifiers. A hardware identifier may be a network or Internet Protocol address, a Media Access Control (MAC) address, a serial number associated with a hardware item such as a processor, network interface card, a hardware dongle, security card, SIM card, embedded electronic serial number, an encryption key, or any other identifier that may be used to identify the hardware.

In some embodiments, the identifier 114 may be a partial identifier that does not individually identify the hardware device but identifies the device with enough specificity for a particular situation. For example, a device that is connected to a network may be assigned a network address from a pool of network addresses within the network. Each time the device is connected to that network the device may receive a different address. Thus, when the device connects to a nameserver, the device may be identified as being within a range of acceptable addresses but may not be identified with the granularity of a specific hardware device or specific user.

In some embodiments, a user specific identifier 114 may be used. The user specific identifier may be a username, password, or some other user identification. In some cases, the identifier 114 may be results from a fingerprint reader, retina scan, or other physiological identifier.

In some cases, a security mechanism 116 on the client 102 may be used in conjunction with a security mechanism 118 on the nameserver 106 to authenticate the client 102 to the nameserver 106. Some such security mechanisms may include mutual authentication, encryption, and other security features. In some embodiments, the security mechanism 116 may provide the identification parameters that may be used by the name resolution service 109 to determine a user's access to a requested hostname address.

An example of a security mechanism 116 and security mechanism 118 may be a Layer 3 security protocol, such as Internet Protocol Security (IPsec). Another example may be Secure Sockets Layer (SSL) or some other security protocol. IPsec, among other security mechanisms, may function as the identifier 114.

The nameserver 106 may create an access log 120 that may track which users or devices had access to specific hosts. The access log 120 may be audited to track access to various hosts on a user or device basis.

In many embodiments, the nameserver 106 may enforce access policies within a local area network or company-wide network to permit or deny access to certain portions of a network for various users. For example, host 110 may have sensitive data used by human resources to which access may be denied to the general company population but may be accessed by human resources personnel.

In the example, the nameserver 106 may be used to direct some traffic to one host 110 while other traffic may be directed to a different host 112. Continuing with the example, a human resources executive may request a website on a server named humanresourses.companyweb. The executive's web browser may request a network address for humanresources.companyweb and may be given an address for host 110, which may be a private or special access server. A general employee of the same company may also attempt to access humanresources.companyweb from a web browser. The general employee may not have access to the private server as defined in the database 118, and may be given an address to the general access host 112.

In some embodiments, the nameserver 106 may be used as a split DNS server that may process requests from inside and outside a network in different fashions. For example, a nameserver 106 may be used to process hostname address requests from clients that are located outside a corporate network. Such clients may request a hostname using a network address that is outside the corporate network. The nameserver 106 may return an address for various externally accessible hosts. The same nameserver 106 may receive requests from clients located inside a corporate or other private network. Because an internal client may have a network address identifiable as internal to the private network, the nameserver 106 may return addresses for internal servers accessible inside the network in lieu or in addition to returning addresses for external servers.

The nameserver 106 may identify clients based on network addresses. In some cases, a network address may be used to identify and classify a client as a 'guest' or other unknown client. Some embodiments of a nameserver 106 may enable a specific set of hostname addresses to be available to clients identified as 'guest', while other embodiments may ignore such requests or return error messages.

The user and hostname database 108 may contain two types of data. The first set of data may include a mapping of hostnames to network addresses. The second set of data may include the client devices or users that are able to access each of the hostnames. Each embodiment may have different database architectures and may be designed for various types of queries.

The database 108 may contain a list of client devices or users that may be authorized to access specific hostnames. In some embodiments, the name resolution service 109 may consult the database 108 to determine if a requester is authorized to communicate with the nameserver 106. If the requester is not authorized to communicate with the nameserver 106, the request may be ignored or otherwise dropped without a response.

The database 108 may have a mapping of which hostnames that may be resolved for a specific user or client device. Such a mapping may be queried when a client device or user is authenticated to determine if the client device or user is permitted to access the host. If the client or user is permitted, the database 108 may be queried to determine the network address to transmit in reply to the initial request. If the client or user is not permitted access, the request may be ignored or an error message may be transmitted. In some cases, the error message may be a network address that directs the client to a default server.

Figure 2:
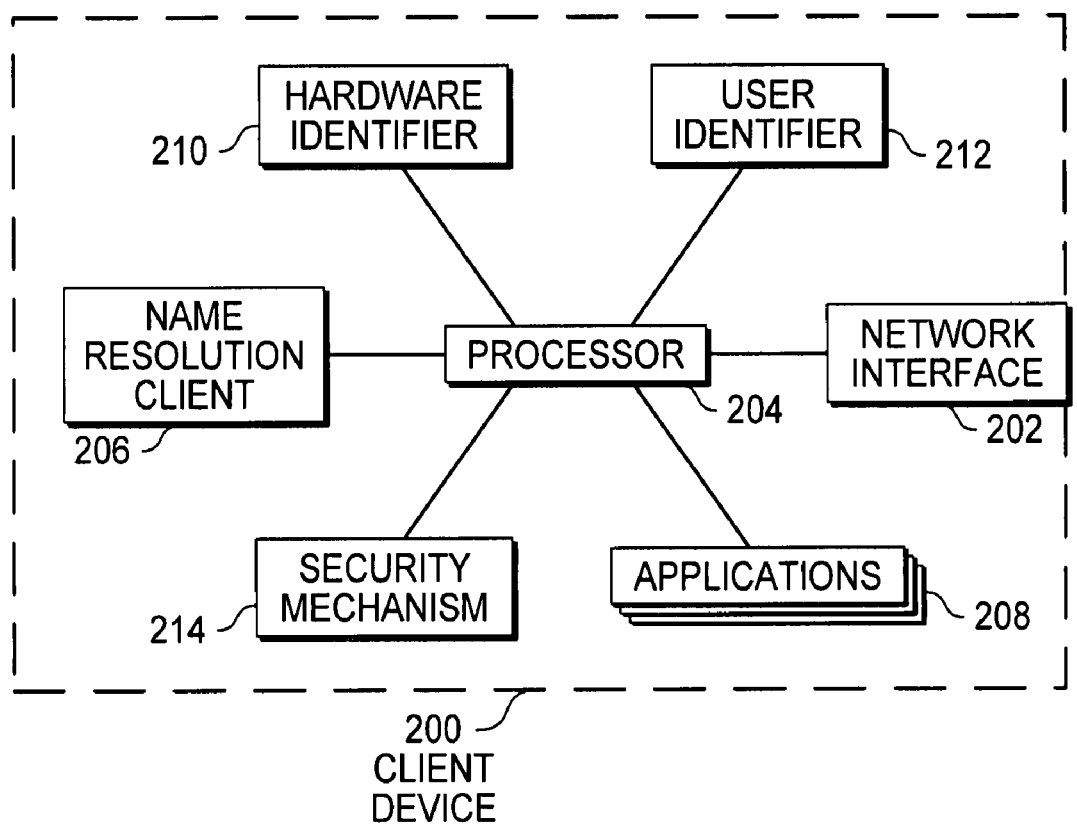
FIG. 2 is a diagram illustration of an embodiment showing a client device.

FIG. 2 is a diagram illustration of an embodiment 200 showing a client device. Embodiment 200 is a simplified example of various functional components that may make up a client device.

The diagram of FIG. 2 illustrates functional components of a system and may not correspond directly with a hardware or software component of a system. In some cases, a component may be a hardware component, a software component, or a combination of hardware and software. Hardware components may include general purpose components adaptable to perform many different tasks or specially designed components that may be optimized to perform a very specific function. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the various functions described.

The client device of embodiment 200 may have a network interface 202 that may communicate with a local area network, wide area network, or the Internet. The network interface 202 may use any type of communication protocol, addressing mechanism, or other network variation.

Embodiment 200 is illustrated with a processor 204 that may operate various functional components, including a name resolution client 206. The name resolution client 206 may receive requests from various applications 208 that may wish to access various hosts through the network interface 202. The name resolution client 206 may perform communications with a nameserver to resolve a network address and respond to the requesting application 208. The requesting application 208 may then establish communications with the host at the network address.

The applications 208 may be any type of application that communicates with a remote host. In some cases, a printer or other peripheral device may be attached to a local area network and accessible by a hostname. For example, when a print spooler or other service attempts to access the printer using the hostname, the name resolution client 206 may receive the hostname, resolve the network address associated with the hostname, and return the address to the requesting service.

Other examples of applications may be web browsers, applications that call web based services, various applications such as accounting, engineering, inventory, or other applications that use remote hosts for data storage or data processing, or any other application or user interface that may connect with or communicate with a remote host.

The name resolution client 206 may use various identifiers to authenticate the client device to a nameserver. The identifiers may include hardware related identifiers and user related identifiers. Hardware related identifiers may be those identifiers that may authenticate the client device as opposed to user related identifiers that may identify the user of the device.

Hardware related identifiers may include any type of serial number, indicator, address, or other identifier that may be used to authenticate the client device to a nameserver. In many cases, a network address or a serial number or MAC address associated with a network interface card may be used. Some embodiments may use a GUID or other specific identifier that is stored on the client device as an identifier.

Some hardware identifiers may include various dongles, security cards, SIM cards, or other devices that may contain an identifier that may be used to authenticate the client device.

In many cases, a hardware identifier may include a network address. The network address may identify a specific network connected device. In some cases, a network communication may be routed through a gateway, router, or other network access point. During such transmissions, a transmission packet may acquire a network address associated with the router or gateway through which the transmission traveled. In such cases, the router or gateway network address may be used as an identifier for the transmission and may be used for an initial authentication or, in cases where less specific authentication is used, as the complete authentication.

In an example of such a configuration, a transmission packet may originate with a client device located behind a firewall or gateway. As the packet passes through the firewall or gateway, the packet may acquire the network address of the gateway. When a nameserver receives the packet, the nameserver database may allow any transmission from the gateway network address to access a specific host. Such a situation may exist, for example, where a company may purchase company-wide access to a specific server, and a nameserver may be configured to allow access to any transmission that comes from the company's gateway, regardless of the device or user located behind the gateway or firewall.

Some identifiers may include a user identifier. A user identifier may be used separately or in conjunction with a hardware identifier to perform client authentication. A user identifier may identify the specific user as opposed to the device. For example, a user name, password, or other credential may be used. In some cases, a personally identifiable hardware device, such as a credit card, ID card, access card, or similar device may be used to identify the user. Such cards may be used on different client devices but may indicate the specific user of the device.

In some embodiments, a user identifier 212 may be a physiological reader such as a fingerprint reader, retina scanner, or other device that may identify a user by some physiological mechanism.

The name resolution client 206 may use various security mechanisms 214 to authenticate the client device to a nameserver. Some security mechanisms may use public and private encryption keys to authenticate one device to another, while others may use other mechanisms. Some communication protocols, such as IPsec, may provide one way or two way authentication between communicating devices in addition to other security measures.

Figure 3:
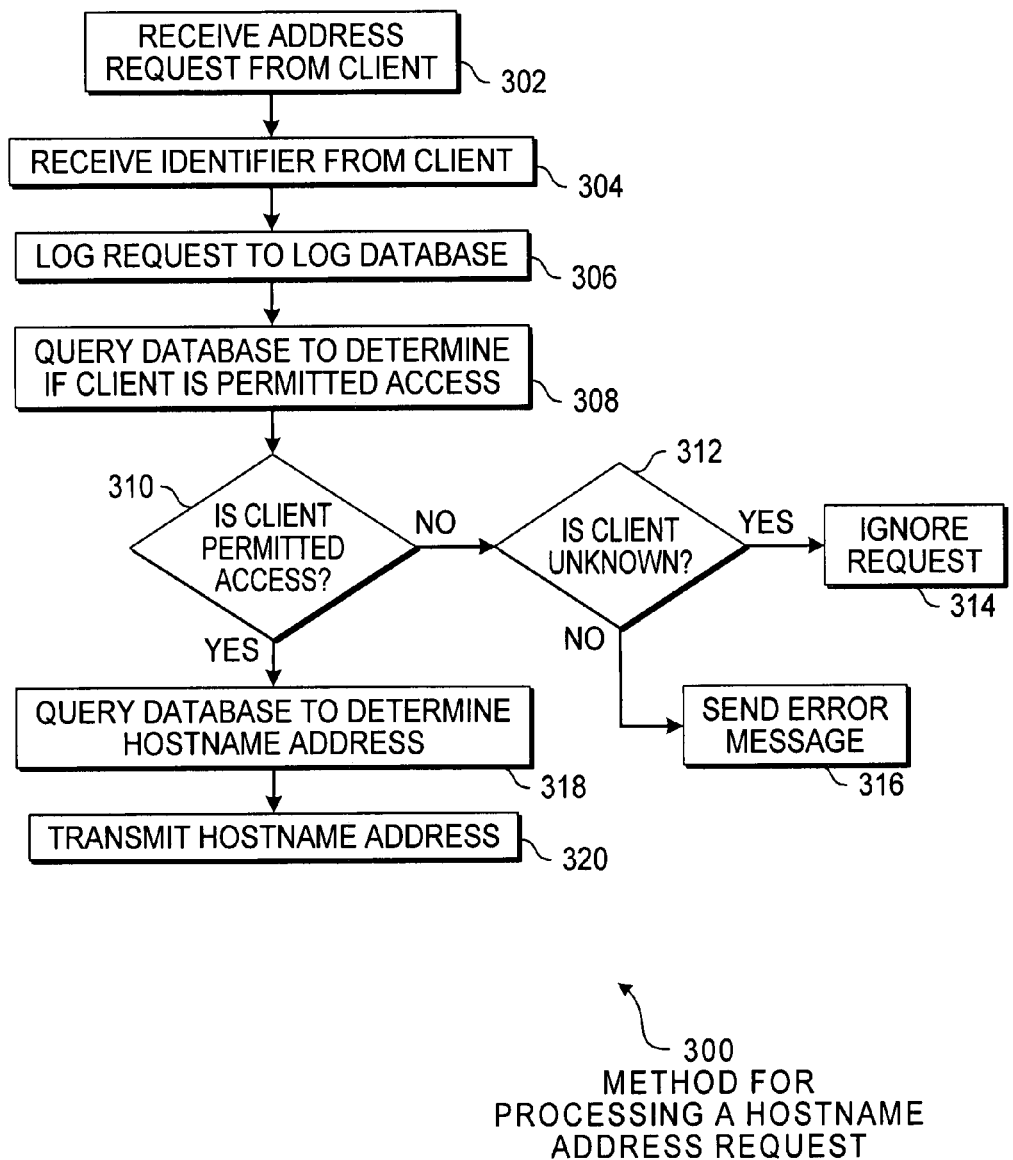
FIG. 3 is a flowchart illustration of an embodiment showing a method for processing a hostname address request.

FIG. 3 is a flowchart illustration of an embodiment 300 showing a method for processing a hostname address request. Embodiment 300 is a simplified example of the functional elements that may make up the operation of a nameserver that uses client identification to process hostname address requests. Other embodiments may use different terminology or nomenclature and may include additional steps or may combine two or more steps into a single step. In other embodiments, some steps illustrated as serial may be performed in parallel and vice versa.

Embodiment 300 is a method by which a hostname address request may be received, a client may be authenticated, and a hostname address returned when the client has permission to access the host. During the process, a database containing permitted clients and hostname addresses may be queried.

An address may be received from a client in block 302. As part of the request or separately from the request, an identifier may be received from the client in block 304.

In some embodiments, a client identifier may be the network address from which a request is sent. Such an address may be included in the network transmission received in block 302. In other embodiments, another type of identifier may be transmitted with an initial request or after a communication session is established between the client and nameserver. Such other types of identifiers may include any type of hardware identifier or user identifier.

The request may be logged in block 306 to a logging database. In many embodiments, a log file may be useful for monitoring network activity as well as an auditable trail of a user's access to certain hosts.

Embodiment 300 may illustrate an authenticating nameserver that may be implemented as a tool for monitoring and controlling access for users to various hosts. Policies may be implemented through the database to allow variable access to users, groups of users, specific devices, or groups of devices to specific hosts. In some cases, the policies may be complex algorithms that enable access during certain periods of time or when other conditions are met.

A logging database may be used to audit activity across a network. When an embodiment uses user specific identifiers, each user's access or attempts to access various hosts may be recorded for later analysis. For example, a disgruntled employee may attempt to access hosts to which the employee is not authorized, which may raise an alarm that the employee may need to be closely monitored.

The logging activity of block 306 may be performed in different sequences in different embodiments. Some embodiments may log requests as the requests are received, as in embodiment 300. Such embodiments may be used where statistics of requesting clients are maintained. Other embodiments may log requests after the requests are dispositioned. For example, a request may be received by a server, processed, and then logged. Such an embodiment may be used when an audit trail may be used to track a user's attempt to access various hosts and whether or not such attempts were successful.

The database may be queried in block 308 to determine if the client is permitted access to the requested host. The database query may involve comparing the identifiers provided by the client to comparable items in the database to verify that the client is permitted access.

If the client is not permitted access in block 310, and the client is unknown in block 321, the request may be ignored. A client may be considered unknown if the client-supplied identifier does not have a match in the database. If the client is known in block 321, an error message may be transmitted in block 316.

In some embodiments, an error message of block 316 may be tailored to different clients or groups of clients. For example, an unidentified client may be ignored as in block 314, while clients that are known may be given an error message that may contain diagnostic messages or other information. In some cases, an unidentified client may be given an error message with no diagnostic information while a known client may be given an error message with a wealth of diagnostic information.

Each embodiment may have different methods or mechanisms for dealing with failed authentication or rejected requests. For example, some embodiments may ignore all failed requests and allow a client to time out in the request. In other embodiments, an unauthenticated client may receive an error message. In some cases, the failed authentication or rejected requests may be logged and categorized for review.

If the client is properly authenticated and permitted access in block 310, the database is queried to determine a hostname address in block 318 and the hostname address is transmitted to the client in block 320.

Embodiment 300 is an example of a method that uses two different queries to a database. Other embodiments may make a single query to a database to determine if the client is authentic, has permission to access the host, and the network address for the requested host. Embodiment 300 was selected to best illustrate various functional elements.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a first address request from a first client device, wherein said first address request is made over a secure session comprising IPsec and said first address request comprises a first hostname;
   determining a first identity for said first client device;
   querying a database with said first identity and said first address request
   determining that said first client device is authorized to access said first hostname; and returning a first network address corresponding with said first hostname.

2. The method of claim 1, said first identity comprising a hardware identity.

3. The method of claim 2, said hardware identity comprising at least one of a group composed of:
   a MAC address;
   an Internet Protocol address; and
   security card.

4. The method of claim 1, said first identity comprising a user identity.

5. The method of claim 4, said user identity comprising at least one of a group composed of:
   a username; and
   a physical verification indicator.

6. The method of claim 1 further comprising:
   receiving a second address request from said first client device, said second address request comprising a second hostname;
   determining said first identity for said first client device;
   querying said database with said first identity and said second address request;
   determining that said first client device is not authorized to access said second hostname; and
   failing to send a second network address corresponding with said second hostname.

7. The method of claim 6, said failing to send comprising ignoring said second address request.

8. The method of claim 6, said failing to send comprising sending an error message.

9. A nameserver being embodied in a computer system, said nameserver comprising:
   a processor;
   a memory for storing data;
   a database comprising a set of hostnames and corresponding network addresses, said first database further comprising a definition of authorized users for at least one of said hostnames;
   a name resolution service adapted to:
      receive a first address request from a first client device, said first address request comprising a first hostname, said first address request being made over a secure session comprising IPsec;
      determine a first identity for said first client device;
      query said database with said first identity and said first address request;
      determine that said first client device is authorized to access said first hostname;
      query said database with at least a portion of said first address request; and
      return a first network address corresponding with said first hostname.

10. The nameserver of claim 9, said first identity comprising at least one of a hardware identity or a user identity.

11. The nameserver of claim 9, said first identity comprising:
   at least one hardware identifier; and
   at least one user identifier.

12. The nameserver of claim 9, said name resolution service further adapted to:
   receive a second address request from said first client device, said second address request comprising a second hostname;
   determine said first identity for said first client device;
   query said database with said first identity and said second address request;
   determine that said first client device is not authorized to access said second hostname; and
   fail to send a second network address corresponding with said second hostname.

13. The nameserver of claim 12, said fail to send comprising ignoring said second address request.

14. The nameserver of claim 12, said fail to send comprising sending an error message.

15. A client device comprising:
   a processor;
   an identifying mechanism adapted to generate an identifier, said identifying mechanism comprising a hardware identifier and a user identifier;
   a name resolution client adapted to:
      transmit a first address request to a nameserver, said first address request comprising a first hostname and requesting a first host address, said first address request being made on a secure session comprising IPsec;
      transmit said hardware identifier to said nameserver; and
      receive said first host address.

16. The client device of claim 15, said identifying mechanism comprising a user physical attribute detector.

17. The client device of claim 15, said user identifier comprising a username.

* * * * *